_US005405468A_

United States Patent [19]

Olson et al.

[11] Patent Number: 5,405,468
[45] Date of Patent: Apr. 11, 1995

[54] PROCESS AND TOOL FOR AIRCRAFT WINDSHIELD REFURBISHMENT

[75] Inventors: Jan B. Olson, Playa del Rey; Howard DeCamp, Northridge; George Gelaude, Palmdale; Ronald Wieting, Sylmar; Connie Maglalang, Palmdale, all of Calif.

[73] Assignee: Sierracin Corporation, Sylmar, Calif.

[21] Appl. No.: 96,162

[22] Filed: Jul. 21, 1993

[51] Int. Cl.⁶ .................. B32B 35/00; B32B 17/10
[52] U.S. Cl. .................. 156/98; 156/101; 156/153
[58] Field of Search ............ 156/98, 94, 101, 106, 156/153, 344; 427/140

[56] References Cited

U.S. PATENT DOCUMENTS

| | | | |
|---|---|---|---|
| 1,342,268 | 6/1920 | Mascart | 156/153 |
| 2,458,032 | 1/1949 | Simon et al. | |
| 2,999,781 | 9/1961 | Davis | 156/153 |
| 3,822,158 | 1/1974 | Hoffman et al. | |
| 4,065,848 | 1/1978 | Dery | |
| 4,133,912 | 1/1979 | Stuart | 156/98 |
| 4,251,572 | 2/1981 | Herliczek | 156/98 |
| 4,592,947 | 6/1986 | Hunter et al. | |
| 4,666,758 | 5/1987 | Hunter et al. | |
| 4,668,317 | 5/1987 | Snyder | |
| 4,707,586 | 11/1987 | Voss et al. | 219/203 |
| 4,724,023 | 2/1988 | Marriott | |
| 4,747,896 | 5/1988 | Anastasie | 156/101 |
| 4,948,443 | 8/1990 | Speer | |
| 5,126,208 | 6/1992 | Larson | |

*Primary Examiner*—Michael W. Ball
*Assistant Examiner*—Daniel J. Stemmer
*Attorney, Agent, or Firm*—Christie, Parker & Hale

[57] ABSTRACT

Refurbishment of an all glass laminate aircraft window is accomplished by removal of the glass face ply and machining the polymeric laminating layer to remove an outer portion while leaving an inner portion adhered to the structural glass ply. The machined polymeric surface is treated to remove machine marks while maintaining a textured surface. A new glass face ply and polymeric laminating film sufficient to fill the machined portion of the polymeric layer are relaminated to the treated surface to provide a new bonded face ply.

12 Claims, 5 Drawing Sheets

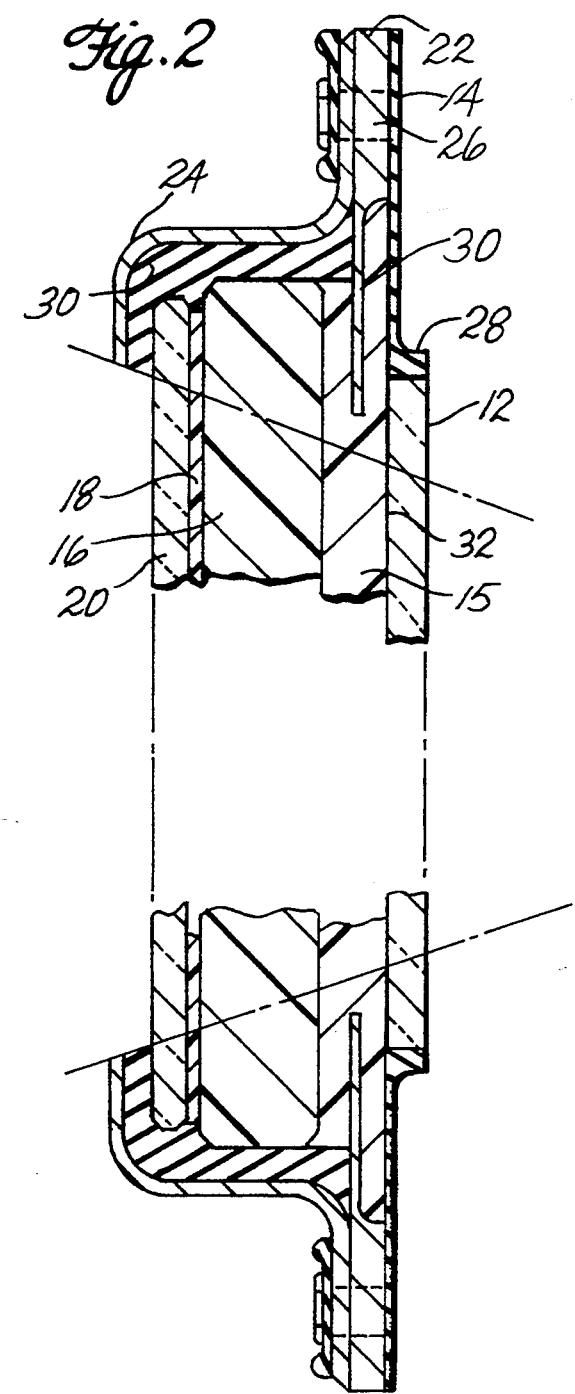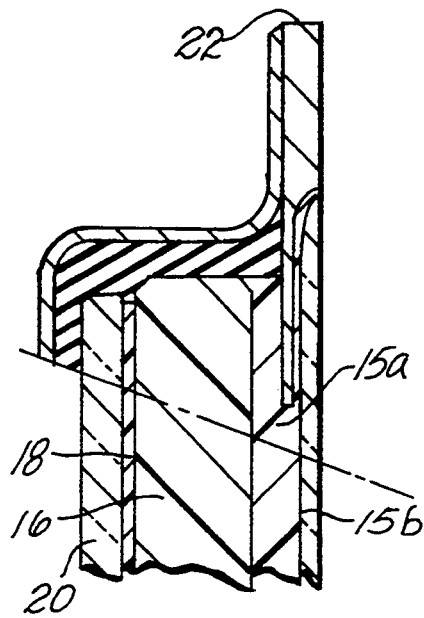

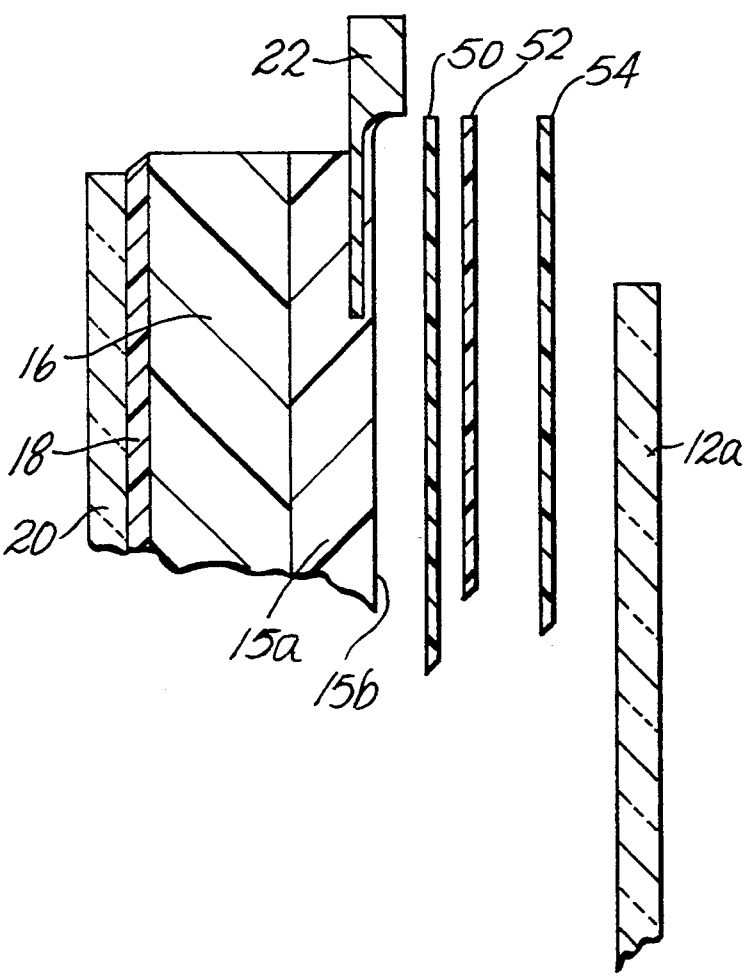

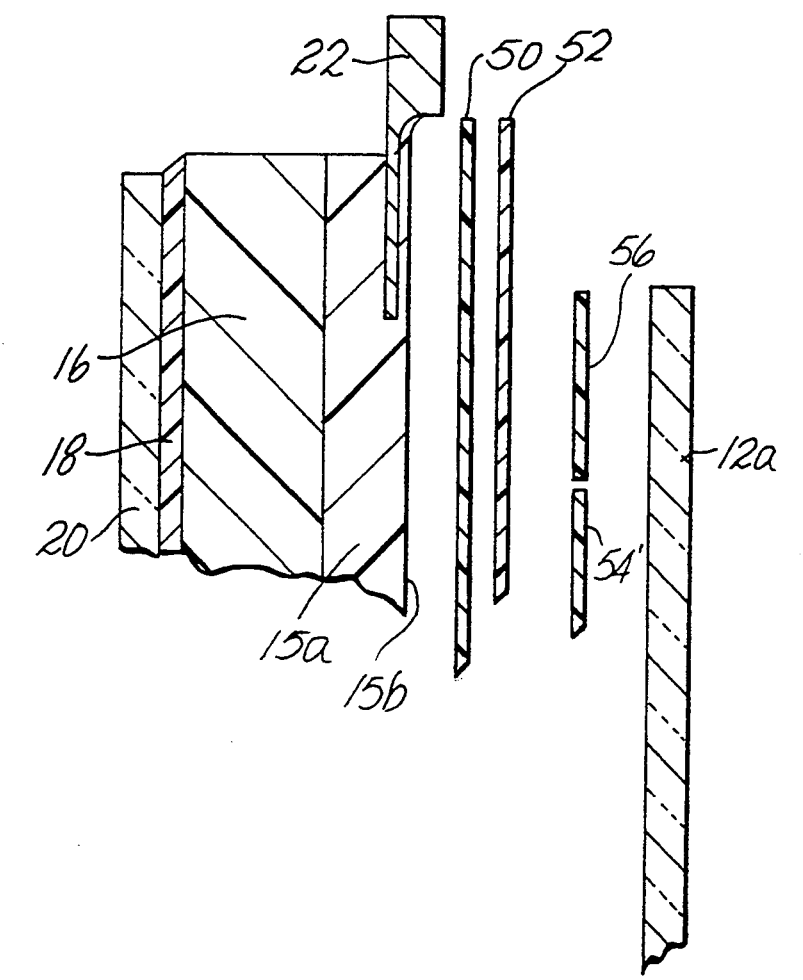

PROCESS AND TOOL FOR AIRCRAFT WINDSHIELD REFURBISHMENT

BACKGROUND OF THE INVENTION

1. Field of the Invention

This invention relates generally to the field of repair of aircraft windshields incorporating laminated glass plies with polymeric laminating film interlayers. More particularly, the invention relates to a refurbishment method incorporating removal of a glass face ply, removing material from the polymeric laminating interlayer by machining, preparing the exposed surface of the polymeric interlayer, and rebonding additional polymeric material and a new face ply.

2. Prior Art

Aircraft windshields typically comprise a laminated structure consisting of layers of glass, acrylic or polycarbonate plastics, or combinations thereof bonded together by interlayers of a polymeric bonding material. This laminated structure provides the high strength at reduced weight necessary for use in aircraft. The environment to which such laminated windshields are exposed is severe and the outer surface, known as the face ply, is often damaged due to particulate impacts, scratching or bond failures (delaminations) at interlayer interfaces and/or electrical faults in anti-icing heater coatings caused by cyclical thermally and mechanically induced stresses, moisture ingress and bond deterioration. Such damage is the chief cause for removal of front windshields, and almost invariably occurs at the inner surface of the outermost ply and/or within the interlayer adjacent thereto.

Replacement of windshield assemblies is expensive, consequently refurbishment of such windshields is desirable if such refurbishment can be accomplished at less than replacement cost. Aircraft windshields incorporating a glass face ply laminated to acrylic structural plies by means of polyvinyl butyral (PVB) interlayers are known as glass/plastic, or composite laminate windshields. Such glass/plastic laminate windshields typically employ a PVB interlayer which is approximately 0.1 inches thick. Damage of the face ply or bond interface between the face ply and the interlayer is typically refurbished in such glass/plastic laminate windshields by removing the windshield from the aircraft, removing the face ply and peeling the entire interlayer from the acrylic structural layer. A new glass face ply is then bonded to the acrylic employing a new interlayer.

Windshields incorporating a glass face ply bonded to glass structural layers in a laminate are typically called glass/glass, or "all glass" laminate windshields. All glass laminate windshields employ a PVB interlayer between the glass face ply and first glass structural ply that is typically thicker than in a glass/plastic laminate windshield and is usually approximately 0.2 inches to 0.4 inches in thickness. The PVB layer typically employs various embedded electrical components such as cabling for heater elements on the glass plies for anti-ice/defog on the windshield and sensor elements for control of the heaters. The structure of all glass laminate windshields has typically precluded cost effective refurbishment of the windshields, and damaged windshields are typically removed and discarded to be replaced with new components. All glass laminate windshields typically have not been repairable due the superior bond strength of the glass to the interlayer which precludes peeling of the interlayer from the glass which is the typical repair approach for glass/plastic laminate windshields. In addition, greater thickness of the glass and the presence of the anti-ice/defog inserts further precludes peeling of the interlayer.

There is a need in the art therefore for a simple and economical process for refurbishing aircraft windshields which incorporate a glass face ply laminated to glass structural plies through PVB interlayers, while maintaining optical requirements of the windshield. The present invention provides a process and tool for accomplishing such refurbishment at significantly reduced cost while maintaining satisfactory optical properties for the refurbished windshield.

SUMMARY OF THE INVENTION

The present invention provides a process for refurbishing an all glass laminate aircraft window wherein the face ply of the window has been damaged, or the anti-ice element or bond between the face ply and polymeric laminating material has been damaged. In the process of the invention, the glass face ply is removed from the laminating film and the surface of the laminating film is machined to remove an outer portion of the polymeric laminating layer leaving an inner portion of the layer adhered to the glass structural ply. Machining of the polymeric surface leaves machine marks on the surface. The surface is treated to remove the machine marks while maintaining a roughened or textured surface. A new glass face ply and polymeric laminating film sufficient to fill the machined portion of the polymeric layer are relaminated to the treated surface of the polymeric layer to provide a new bonded face ply.

Machining of the polymeric interlayer requires the use of a cutting tool providing a reasonable rate of material removal for economic machining while maintaining a low temperature in the polymeric material to avoid softening or gumming of the polymer which would result in unsatisfactory machining performance and an inadequate surface for relamination. A rabbet cutter for machining the vinyl material of the laminating interlayers is employed with the process of the invention to achieve the desired machining and surface characteristics. The cutter incorporates cutting inserts having an increased clearance between the blade contact with the work piece and the body of the cutter. Axial rake and peripheral clearance angles for the blade and a radiused blade having a pronounced face cutting edge clearance angle inboard of the radius provides the desired cool operating characteristics for machining the vinyl in the present process.

DESCRIPTION OF THE DRAWINGS

The details of the present invention will be more clearly understood with reference to the following drawings.

FIG. 2 is a cross-section of the windshield configuration of FIG. 1 taken along line 2—2 at a substantially double relative scale;

FIG. 3 shows the cross-section of the windshield after removal of the glass face ply and machining of the PVB interlayer;

FIG. 5 is a schematic cross-section of the lay up for rebonding of the glass face ply employing layers of PVB material; and FIG. 6 is a schematic cross-section of the layup for rebonding of the glass face-ply employing a urethane ring for stress reduction.

DETAILED DESCRIPTIN OF THE INVENTION

Figure 1:
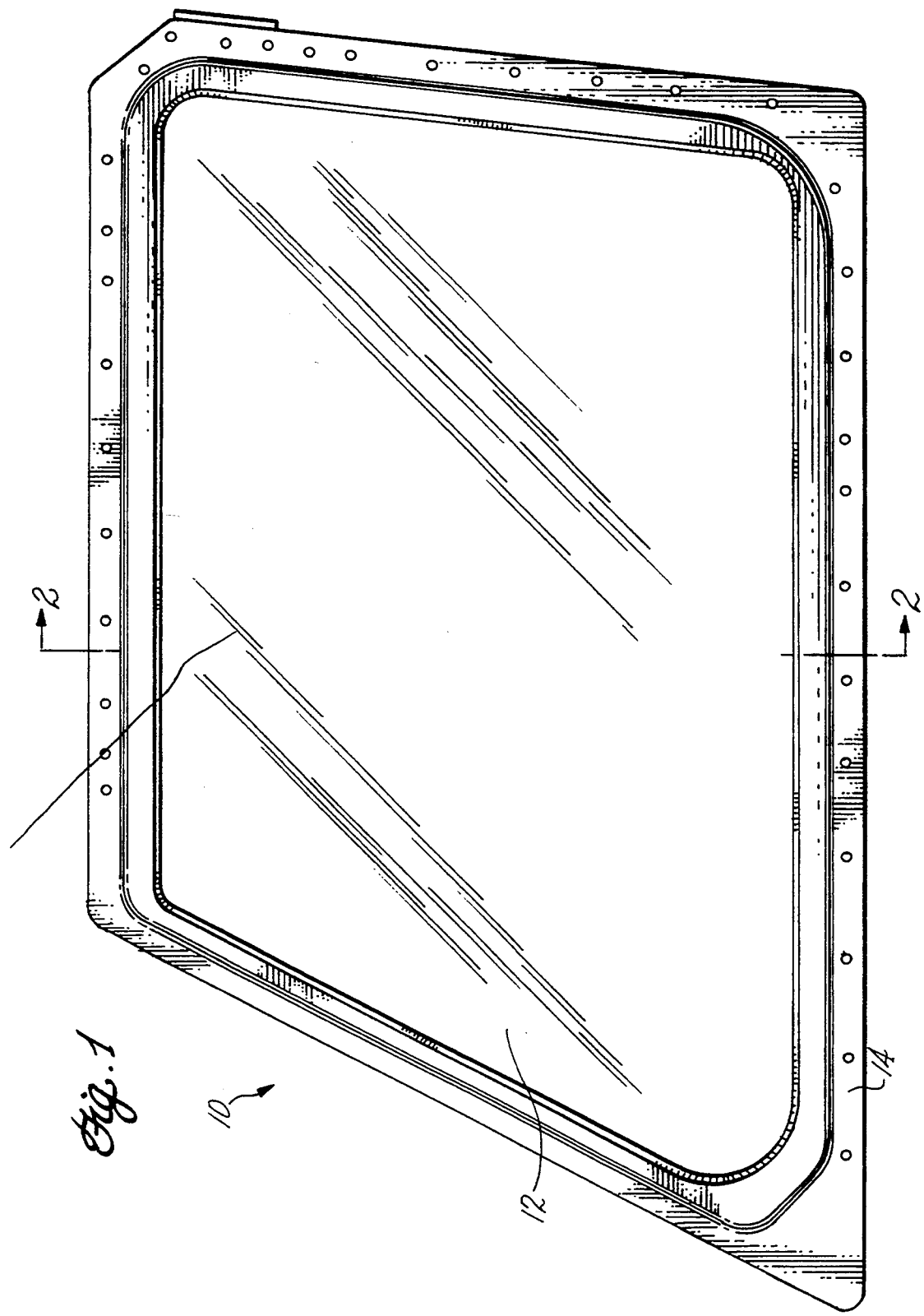
FIG. 1 is a face view of a typical all glass laminate windshield configuration for aircraft use.

FIG. 1 shows a face view of the installed configuration of an exemplary all glass laminated windshield 10. The glass face ply 12 forms the exterior surface of the windshield and is the outer element of the laminated glass and polyvinyl butyral (PVB) structure. The laminated structure is mounted in a frame 14 which surrounds the transparent portion of the windshield and provides means for mounting the windshield to the structure of an aircraft. The mounting frame comprises several elements which will be discussed in detail subsequently. The embodiment shown in the drawings and described in detail herein demonstrates the invention for one specific aircraft windshield configuration. The invention is equally applicable to other configurations.

A cross-section of the exemplary windshield is shown in FIG. 2 which demonstrates the laminated structure of the windshield and the various integral mounting provisions. The face ply constitutes the first layer of the all glass structural laminate. The face ply is glass and typically incorporates a heating element for deicing of the aircraft windshield. A first PVB layer 15 bonds the face ply to a glass core ply 16 which provides structural strength for the windshield. A second PVB layer 18 bonds the inner glass ply or crew shield 20 to the laminate. The frame of the window comprises a metal insert 22 which is embedded in the first PVB layer and a sealing support for the glass laminate known as the pan 24 which interfaces with the metal insert with matched bolt holes 26 for attachment to the aircraft structure. A bumper strip 28 and integral sealant form an edge protection for the face ply, a flexible adhesive bedding sealant 30 provides an interface between the pan and the laminated glass structure.

In original fabrication for the embodiment shown in the drawings, the outer PVB layer comprises approximately 18 separate vinyl sheets which are cut and tacked to provide the desired thickness of 0.360 inches minimum after lamination of the structure in a high temperature vacuum process. Dimensions of the individual vinyl sheets are dependent on their location external to the lip 30 of the metal insert, contiguous therewith or internal to the insert. In addition, the thicknesses of various layers vary between 0.020 inches and 0.030 inches with differing hardness values selected for optimum bonding to adjacent sheets or glass plies. The invention disclosed herein may also be applied to laminates employing an outer layer of urethane adjacent the glass ply of the face sheet as disclosed in U.S. Pat. No. 4,073,986. Similarly, the second PVB layer comprises a plurality of vinyl sheets, typically four, to provide a minimum thickness of 0.065 inches for the embodiment shown in the drawings. Damage to windshields such as those shown in the drawings typically occurs by pitting, scratching or other optical or structural damage to the face ply at surface 12, or delamination and/or electrical coating failure at the interface 32 between the face ply and first PVB layer.

The repair process of the present invention is accomplished by shattering the face ply with a pneumatic hammer or other appropriate means, and removing the broken glass which is freed. Any remaining adhered glass chips are broken by rehammering the assembly, and the exposed PVB surface is disk sanded to remove all remaining glass chips and slivers. In the embodiments presently demonstrated, 50 grit abrasive paper is employed on the disk sander to achieve satisfactory glass chip removal.

As shown in FIG. 3 the outer surface of the first PVB layer is machined to remove a portion of the PVB material to create a new surface 15b for the PVB layer (designated 15a in its machined form). In a first demonstrated embodiment, a numerically controlled machining set up is employed to remove approximately a 0.05 inch thickness of PVB from the outer surface. In a second tested embodiment, machining is accomplished in four phases accomplishing a first cut to 0.055 inches, a second cut to 0.065 inches, a third cut to 0.070 inches with a final cleanup pass also at 0.070 inches. The objective of the machining is to remove sufficient material to allow insertion of at least one and preferably several vinyl sheets as previously described for relaminating the windshield, and replacement of the sensors, which typically reside at a depth below the surface of interface 32. As examples of this process, machining to remove approximately 0.05 inches of material allows insertion of a 0.020 vinyl sheet and a 0.030 vinyl sheet for relamination to maintain the minimum 0.360 inch thickness of the first PVB layer. With the second example process, two 0.020 vinyl sheets in combination with a 0.030 vinyl sheet are employed.

Modification of the depth of the machine cut in the PVB material is accomplished in alternate embodiments to provide optimum relamination of the structure while meeting minimum tolerances for the first PVB layer thickness. Total depth of cut across the surface may vary to maintain parallelism between the machined surface and the back surface of the laminate to ensure that the optical deviation requirements will be met in the completed refurbishment.

Machining of the first PVB layer as described allows the remainder of the laminate to remain intact including the metal insert thereby avoiding the cost of reassembling larger numbers of vinyl sheets for creating the PVB layer laminates and location of the metal insert.

Figure 4A:
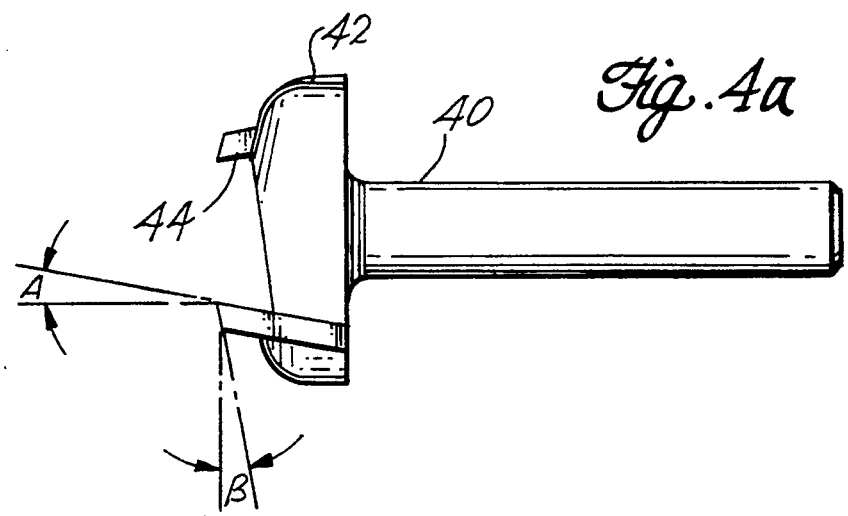
FIG. 4a through c are orthogonal views of the rabbet cutter employed with the present invention.
Figure 4B:
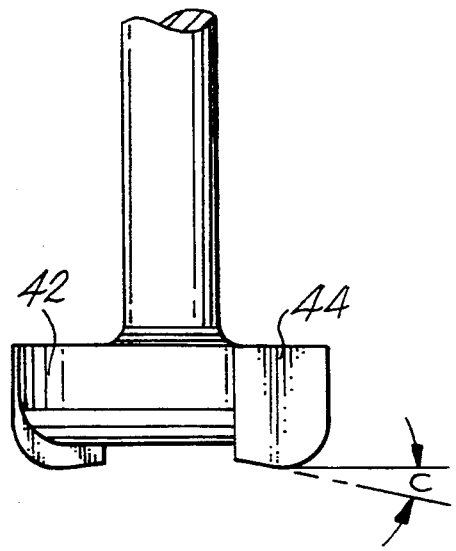
Figure 4C:
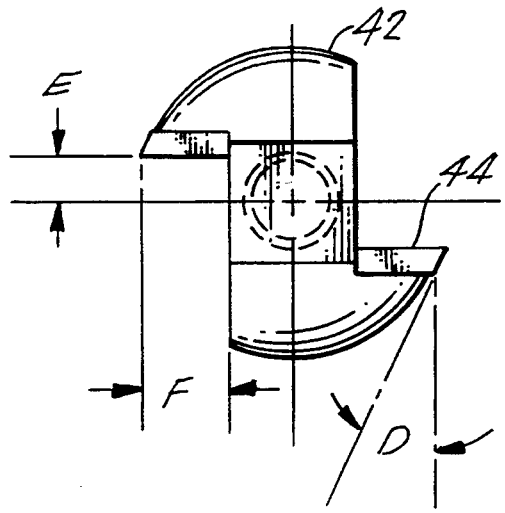

Machining of the PVB surface is accomplished using an end mill or router system employing a rabbet cutter as disclosed in FIG. 4a, b and c. Machining of the PVB surface must be accomplished without creating excessive heating in the material which would result in gumming or melting of the PVB material. The preferred cutter disclosed in the drawings incorporates a tool body comprising a shank 40 and tool head 42 as shown in FIG. 4a. The cutting inserts in the embodiment shown in the drawings comprise K-6 or equivalent carbide and are attached to the head of the tool with a significant clearance of approximately 3/16 inch. The axial rake A of the cutters is relatively aggressive and for the embodiment shown in the drawings is approximately 10°. A face clearance angle B of approximately 15° for the embodiment shown in the drawings is employed. As best seen in FIG. 4b, the cutter inserts incorporate a radiused cutting edge which terminates in a radial relief angle C of approximately 10°. In the embodiment shown in the drawings a 0.25 inch full radius is provided for the cutting edge. As best seen in FIG. 4c a peripheral clearance angle D of 30° is employed. The cutting inserts are mounted to provide a 1.69 inch cutting diameter while diameter of the tool head is 1⅜ inch.

The cutting face of the insert has an offset E of 0.25 inches from the center line of the body to provide an effective radial rake angle for the cutter. The radial depth F of the insert is 0.050 inches providing a ratio of insert depth to offset of 2 to 1.

The tool embodiment disclosed in FIGS. 4a, b, and c is operated in the previously defined four cut machining profile at a feed rate of 150 inches per minute at a maximum of 4,200 rpm. In testing of the process to date this has proved to provide optimum cutting efficiency while precluding melting of the PVB without the need for special surface or cutter cooling.

Upon completion of machining the exposed surface 15b of the first PVB layer contains machine marks. Such machine marks, if not eliminated, would create an optical artifact upon relamination of the windshield resulting in unacceptable optical performance. The process of the present invention employs treatment of the machine surface to eliminate the machine marks and provide a textured surface to allow air to escape during the lamination process to be described subsequently.

Evaluation of the experimental embodiments of the present invention indicates that the PVB of the original layer is harder, and melts or flows at a higher temperature than replacement PVB sheets used for relamination. Vinyl from the new PVB sheets flows into the texture of the old PVB surface during autoclaving. The presence of machine marks, directional striation of the material in other than the vertical direction or excessive texture on the prepared PVB surface prior to relamination therefore remain and will likely cause optical degradation in excess of allowable requirements. Appropriate texturing of the old PVB surface may also enhance the structural integrity of the relaminated structure.

In a first embodiment of the invention the machined surface is sanded using an orbital or "jitterbug" sander employing successive grits of 80, 100, 180, 220 and 240 which provides satisfactory optical performance after relamination. The sanding is accomplished by moving the sander in one direction (preferably the vertical direction with respect to the installed windshield) on the machined face thereby orienting any remaining optical artifacts to obtain desired optical performance from the completed windshield as installed. After completion of the sanding operation the surface of the PVB layer is wire brushed in the sanded direction to remove any remaining sanding dust. The prepared surface is then ready for relamination.

As an alternative to sanding of the machine surface of the PVB layer, a hot platen may be applied to the surface to remove the machine marks. Texturing of the platen to remold the surface to the appropriate texture for air removal during laminating is accomplished.

As a second alternative, chemical treatment of the exposed surface of the machined PVB layer may be accomplished to remove the machine marks while again retaining a desired textured surface for air removal and adhesion during relamination.

Lay up of the new laminate is accomplished beginning with the existing laminated structure as shown in FIG. 3 with the surface of the first PVB layer treated as described above. As shown schematically in FIG. 4 for the embodiment of the invention where 0.070 inches has been removed from the first PVB layer as previously described, three PVB sheets are cut to size to be received within the metal insert. The two inner vinyl layers 50 and 52 comprise 0.020 inch AG "hard" vinyl (19 pph). The outer most vinyl layer 54 comprises a 0.030 inch TG soft (32 pph) layer which interfaces the new face ply 12a, the outer surface of the 0.030 soft vinyl ply employs a ribbed surface for interface with the glass face ply to allow migration of trapped air from the laminate during autoclaving. During layup of the vinyl sheets, slip plane media is inserted between the sheets proximate the edges of the sheets to allow stress reduction in the PVB interlayer during thermal cycling. 3M-#5 tape of approximately ½ inch width is employed as the slip plane media in the embodiments disclosed herein. After lay up of the three vinyl plies, the new glass face ply is centered on the laminate.

Laminating of the repair lay up is accomplished by bagging the assembly employing the standard procedures using Capron 80 or other appropriate material for the bag and applying vacuum to the bag for a period of approximately four to five hours. The evacuated laminate is then laminated in the autoclave using a cycle with a prelamination heat soak of 290° F. and a lamination temperature of 250° F. at 75 psi pressure in the autoclave, for approximately 45 minutes, followed by cool down of the part and removal from the autoclave.

In an alternative embodiment of the present invention, a silicone layer is employed as a replacement for one or more of the vinyl layers in the refurbishment layup. Silicone provides a softer layer to act as a local stress reducing "cushion" between the PVB interlayers and glass structural plies. Obtaining the silicone layer in the layup is accomplished employing several techniques compatible with the present invention. The first technique employs uncured silicone sheet such as that available from Dow-Corning in 25 mil thicknesses carrying designation X4-4647. Pretreatment of the silicone sheets prior to lamination is required to obtain an acceptable surface with no lines or wrinkles. The silicone sheets are cold-pressed under vacuum against the replacement glass face-ply for approximately 12 hours. A low surface energy release film such as Mylar or PET is employed between the exposed surface of the silicone sheet and the press tool which typically comprises a second glass ply. Prior to assembly of the laminate, the release film is removed exposing the silicone surface.

The machined surface of the PVB in the laminate being refurbished is further processed after sanding and brushing, as described previously, by optical press polishing at elevated temperature again employing a peelable release film such as Mylar or PET on top of the machined vinyl. Prior to lamination the release film is removed and the glass face-ply with uncured silicone sheet is mated against the machined PVB surface for autoclaving.

The autoclave cycle is accomplished at temperatures less than the flow temperature of the PVB to avoid distortion in the completed laminate. Temperatures of approximately 250° F. at pressures of approximately 200 psi have demonstrated satisfactory performance.

Use of a silicone sheet as a replacement for one or more PVB layers in the refurbishment layup eliminates the requirement for insertion of slip-plane media between the layers as required with multiple PVB layers to eliminate stress concentration during thermal cycling.

A second approach to use of the silicone layer in the refurbishment laminate is accomplished by precuring the silicone layer to the glass face-ply with a very thin PVB skin on the surface of the silicone ply opposite the glass. This creates a PVB adherable prelaminate which is assembled directly to the machined, sanded, and brushed PVB interlayer for lamination in the autoclave.

The PVB skin is applied to the silicone layer as a sheet attached to the curing tool, or, as a spray, flowcast, curtain coat or other liquid coating means on the silicone surface prior to pre-curing with the glass face-ply.

As a third approach for the silicone interlayer, the silicone is introduced as a liquid onto the press polished surface of the machined PVB interlayer previously described and puddle-cast with the glass face-ply during lamination. Employing the puddle-cast technique with silicone poured at the window center, a 5 mil to 10 mil ultimate thickness of the silicone is achieved in the laminate thereby allowing a very thin layer of silicone in the process. Liquid silicone produced by General Electric as CRTV6302 or Sierracin S-100 have been employed successfully in this process.

A third alternate embodiment for the present invention, which also allows elimination of the slip-plane media during layup, is shown in FIG. 6. One (or more) of the vinyl replacement layers 54' is reduced in size to less than the dimension of the glass face-ply. A urethane ring 56 is inserted during the layup prior to lamination. The softer urethane layer intermediate the glass face-ply and PVB interlayer proximate the edge of the glass reduces stresses in the laminate thereby eliminating the requirement for slip-plane media.

Material employed successfully in the embodiment disclosed herein for the urethane ring comprises Sierracin S-121 urethane sheet.

As a fourth alternative embodiment for the present invention, a urethane sheet is employed as a replacement for one or more of the top layers of PVB in the repaired laminate. A complete urethane sheet provides improved optical quality over the urethane ring previously described and provides simpler processing than the silicone sheet for certain applications.

Having now described the invention in detail as required by the patent statute, those skilled in the art will recognize modifications to the present invention for specific applications. Such modifications are within the scope and intent of the present invention as identified by the following claims:

What is claimed is:

1. A method for refurbishing an aircraft windshield which incorporates a glass face ply as the outer layer of a laminated window structure having a glass structural ply and an interlayer comprising a polymeric laminating film, the method comprising the steps of:

removing the glass face ply from the laminating film;
    machining the film surface to remove a first outer portion thereof leaving an inner portion adhered to the glass structural ply wherein said machining leaves a plurality of machine marks on the laminating film surface;
    treating the film surface to remove the machine marks and provide an appropriately textured surface; and
    laminating a glass face ply and replacement polymeric laminating film onto the treated film surface thereby providing a new exterior surface for the windshield.

2. A method according to claim 1 wherein the polymeric laminating film and replacement polymeric laminating film are polyvinyl butyral.

3. A method according to claim 1 wherein the machine marks are removed from the polymeric film surface by sanding.

4. A method according to claim 3 wherein the sanding is performed in a series of steps, said steps comprising starting with a relatively coarser grit sanding medium and ending with a sanding medium of no more than about 240 grit.

5. A method according to claim 1 wherein the treating of the film surface comprises the step of applying a heated platen to the machine surface for melting of the surface to eliminate the machine marks.

6. A method according to claim 1 wherein the step of treating the film surface comprises the step of contacting the surface with a chemical reagent to dissolve a portion of the surface which contains the machine marks and evaporating said chemical reagent allowing the dissolved material to reset without the machine marks.

7. A process according to claim 1 wherein the laminating step further comprises precuring a silicone sheet to the glass face-ply with a PVB adherable skin on the silicone sheet opposite the glass face-ply.

8. A method according to claim 1 wherein the polymeric laminating film is polyvinyl butyral and wherein the laminating step comprises the steps of:

laying up at least one polyvinyl butyral sheet having dimensions less than the glass face-ply, and
    laying up a urethane ring on the glass face-ply surrounding the polyvinyl butyral sheet.

9. A method according to claim 1 wherein at least a portion of the replacement polymeric laminating film comprises urethane.

10. A method for refurbishing an aircraft windshield which incorporates a glass face-ply as the outer layer of a laminated window structure having a glass structural ply and an interlayer comprising polyvinyl butyral laminating film, the method comprising the steps of;

removing the glass face-ply from the laminating film;
    machining the film surface to remove a first outer portion thereof leaving an inner portion adhered to the glass structural ply, wherein said machine leaves a plurality of machine marks on the laminating film surface;
    treating the film surface to remove the machine marks by press polishing the film surface; and
    laminating a glass-face ply and silicone layer onto the treated film surface thereby providing a new exterior surface for the windshield.

11. A method according to claim 10 wherein the step of laminating further comprises the steps of:

cold pressing an uncured silicone sheet with a low energy release film to a glass face ply to remove optical distortions in the silicone; and,
    removing the release film prior to lamination.

12. A method as defined in claim 10 wherein the step of laminating further comprises puddle casting flowable silicone to form the silicone layer.

* * * * *

UNITED STATES PATENT AND TRADEMARK OFFICE
CERTIFICATE OF CORRECTION

PATENT NO. : 5,405,468
DATED : April 11, 1995
INVENTOR(S) : Jan B. Olson; Howard DeCamp; George Gelaude
Ronald Wieting; Connie Maglalang It is certified that error appears in the above-indentified patent and that said Letters Patent is hereby corrected as shown below:

Column 3, line 8, change "DESCRIPTIN" to
-- DESCRIPTION --.

Column 4, line 47, change "FIG. 4a, b and c" to
-- FIGS. 4a, 4b, and 4c --.
Column 4, line 68, before "diameter" insert -- the --.

Column 5, line 2, change "center line" to
-- centerline --.
Column 5, line 6, change "FIGS. 4a, b, and c" to
-- FIGS. 4a, 4b, and 4c --.
Column 5, line 68, change "outer most" to
-- outermost --.

Signed and Sealed this

Fifth Day of December, 1995

Attest:

BRUCE LEHMAN

*Attesting Officer*     *Commissioner of Patents and Trademarks*